US011592591B2

(12) United States Patent
Cabella et al.

(10) Patent No.: US 11,592,591 B2
(45) Date of Patent: Feb. 28, 2023

(54) THROUGH TUBING ACOUSTIC MEASUREMENTS TO DETERMINE MATERIAL DISCONTINUITIES

(71) Applicant: Halliburton Energy Services, Inc., Houston, TX (US)

(72) Inventors: Brenno Caetano Troca Cabella, Rio de Janeiro (BR); Ruijia Wang, Singapore (SG); Yao Ge, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 25 days.

(21) Appl. No.: 17/334,977

(22) Filed: May 31, 2021

(65) Prior Publication Data

US 2022/0381935 A1    Dec. 1, 2022

(51) Int. Cl.
| | |
|---|---|
| *G01V 1/50* | (2006.01) |
| *E21B 49/00* | (2006.01) |
| *E21B 47/00* | (2012.01) |
| *E21B 47/005* | (2012.01) |
| *E21B 47/14* | (2006.01) |

(52) U.S. Cl.
CPC .............. *G01V 1/50* (2013.01); *E21B 47/005* (2020.05); *E21B 49/00* (2013.01); *E21B 47/14* (2013.01); *G01V 2210/1299* (2013.01); *G01V 2210/1429* (2013.01); *G01V 2210/64* (2013.01)

(58) Field of Classification Search
CPC .......... G01V 1/50; E21B 47/005; E21B 49/00
USPC ............................................ 367/35; 181/105
See application file for complete search history.

(56) References Cited

U.S. PATENT DOCUMENTS

| | | | |
|---|---|---|---|
| 5,763,773 A | 6/1998 | Birchak et al. | |
| 10,067,262 B2 | 9/2018 | Quintero et al. | |
| 10,408,037 B2 | 9/2019 | Grisch et al. | |
| 10,801,997 B2 | 10/2020 | Zhao et al. | |
| 10,858,933 B2 | 12/2020 | Bose et al. | |
| 2009/0231954 A1 | 9/2009 | Bolshakov et al. | |
| 2012/0199397 A1* | 8/2012 | Wessling | ................ E21B 47/06 324/303 |
| 2015/0218930 A1 | 8/2015 | Zeroug et al. | |
| 2017/0168183 A1 | 6/2017 | Hayman et al. | |
| 2020/0033494 A1 | 1/2020 | Patterson et al. | |
| 2020/0088901 A1 | 3/2020 | Quintero et al. | |

OTHER PUBLICATIONS

"GB Application No. 2117692.0 Examination Report", May 24, 2022, 6 pages.

* cited by examiner

*Primary Examiner* — Ian J Lobo
(74) *Attorney, Agent, or Firm* — Delizio, Peacock, Lewin & Guerra

(57) ABSTRACT

Methods and systems are disclosed for determining a material property transition within a wellbore. In some embodiments, a method includes determining a material transition profile for each of a plurality of test points within a linear measurement path including, for each test point, determining an acoustic response for a first location within the linear measurement path, and determining an acoustic response for a second location within the linear measurement path. The test point is between the first and second locations. The method further includes generating a material transition profile for the test point based, at least in part, on a difference between the acoustic response at the first location and the acoustic response at the second location.

20 Claims, 11 Drawing Sheets data matrix
400

|  | | Angles | | | |
|---|---|---|---|---|---|
|  | | 0º | dΘ | 2*dΘ | ... | (360º - dΘ) |
| Time | 0 | a(0,0) | a(0,1) | a(0,2) | a(0,M) |
|  | dt | a(1,0) | a(1,1) | a(1,2) | a(1,M) |
|  | 2dt | a(2,0) | a(2,1) | a(2,2) | a(2,M) |
|  | ⋮ | ⋮ | ⋮ | ⋮ | ⋮ |
|  | T | a(N,0) | a(N,1) | a(N,2) | a(N,M) |

450

THROUGH TUBING ACOUSTIC MEASUREMENTS TO DETERMINE MATERIAL DISCONTINUITIES

BACKGROUND

The disclosure generally relates to downhole acoustic measurements and to systems and method for applying comparative acoustic response processing to determine material properties including material discontinuities such as may be caused by channels within wellbore cement layers.

Well development, completion, and termination operations often include evaluating wellbore structural features such as the annular cement sheath between a borehole wall and a metallic wellbore casing. Evaluation of the cement sheath in terms of bonding within the borehole and the casing may be helpful in determining quality of well zonal isolation that is important to ensure sufficient downhole pressure seals to prevent leakage of formation fluids from downhole to surface or into adjacent formations. Wellbore structural evaluation may be performed following cementing and/or during the production life of a well and/or before and in preparation for plug and abandonment. For example, cement bond logging (CBL) is a technique in which an acoustic measurement tool, such as an ultrasonic measurement tool, is utilized to collect acoustic measurement data that may be interpreted to determine bonding particularly between the casing and cement. The cement bond quality is frequently compromised by the presence of void channels within the cement layer. Such channels may percolate through long axial distances along a wellbore changing azimuthal orientation at different axial positions.

Following cementing of a new well and prior to production, an acoustic measurement tool may be deployed such as via wireline into a cased and cemented borehole prior. Such acoustic measurement tools and techniques are relatively effective prior to deployment or otherwise in the absence of additional tubing such as production tubing that diminish acoustic signal transmission. However, withdrawing downhole tubing from a cased borehole to perform acoustic testing is a large scale and expensive procedure.

A completed wellbore typically includes two or more concentrically layered metallic tubulars such as the outer casing and additional inner casings and production strings. The multiple concentric layers present substantial complexity in obtaining sufficiently precise and accurate final results from processing acoustic signatures that incorporate multivariate factors such as annular thickness and uniformity, material variations, and acoustic signal source variation.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures, and techniques have not been shown in detail in order not to obfuscate the description.

Overview

Embodiments are directed to TTCE that accurately and efficiently determines the horizontal and vertical locations of material transition boundaries such as cement boundaries of channels within a cement layer. So-called channeling is a condition resulting from uneven cement flow during the cementing outside the wellbore casing. A channel itself is an elongated path within a cement layer in which cement is absent.

Embodiments are directed to increasing the measurement sensitivity of through tubing wellbore evaluation such as TTCE and direct high energy acoustic signals at target points such as at or near a casing, a cement layer, and/or a casing/cement interface. In some embodiments, a directional acoustic sensor is disposed at within a wellbore. The wellbore may comprise multiple distinct annular material layers including at least two metallic tubing layers such as a production tubing string within a casing string. The metallic layers may be interleaved between annular fluid layers and an annular cement layer is typically formed outside a casing string between the casing and downhole strata. The acoustic sensor is disposed in an innermost conduit within the wellbore and may comprise a unipolar (i.e., unidirectional) acoustic transmitter and/or acoustic receiver that are configured to measure acoustic response signals (e.g., acoustic echoes) that can be further processed to determine material transitions within the wellbore. The acoustic sensor may collect azimuthally adjacent and/or axially adjacent acoustic measurements along the wellbore.

In some embodiments, a method for determining a material transition within a wellbore may include downhole measurement collection and processing operations. For example, a method may include determining a material transition profile for each of a plurality of test locations within a linear measurement path. For a given test location, an acoustic response is determined at a first location within the linear measurement path. An acoustic response is determined at a second location within the linear measurement path, wherein the test location is centered between the first and second locations along the linear measurement path. A material transition profile is generated for the test location based, at least in part, on a difference between the acoustic response at the first location and the acoustic response at the second location. Material transition boundaries may be determined based on the absolute and/or relative values of the transition profiles for two or more of the test points.

Example Illustrations

Figure 1A:
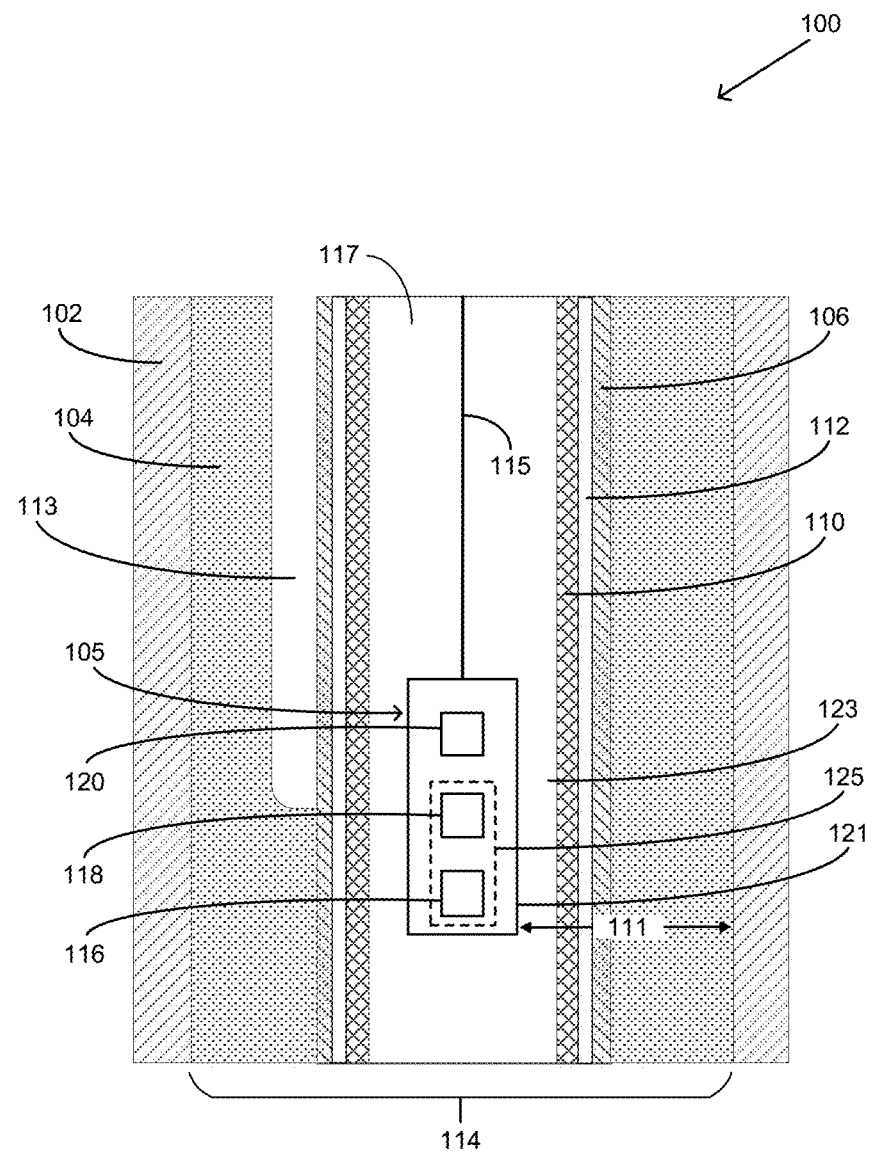
FIG. 1A depicts a side cross-section view of a downhole through tubing cement evaluation (TTCE) apparatus that includes an acoustic logging tool configured in accordance with some embodiments.
Figure 1B:
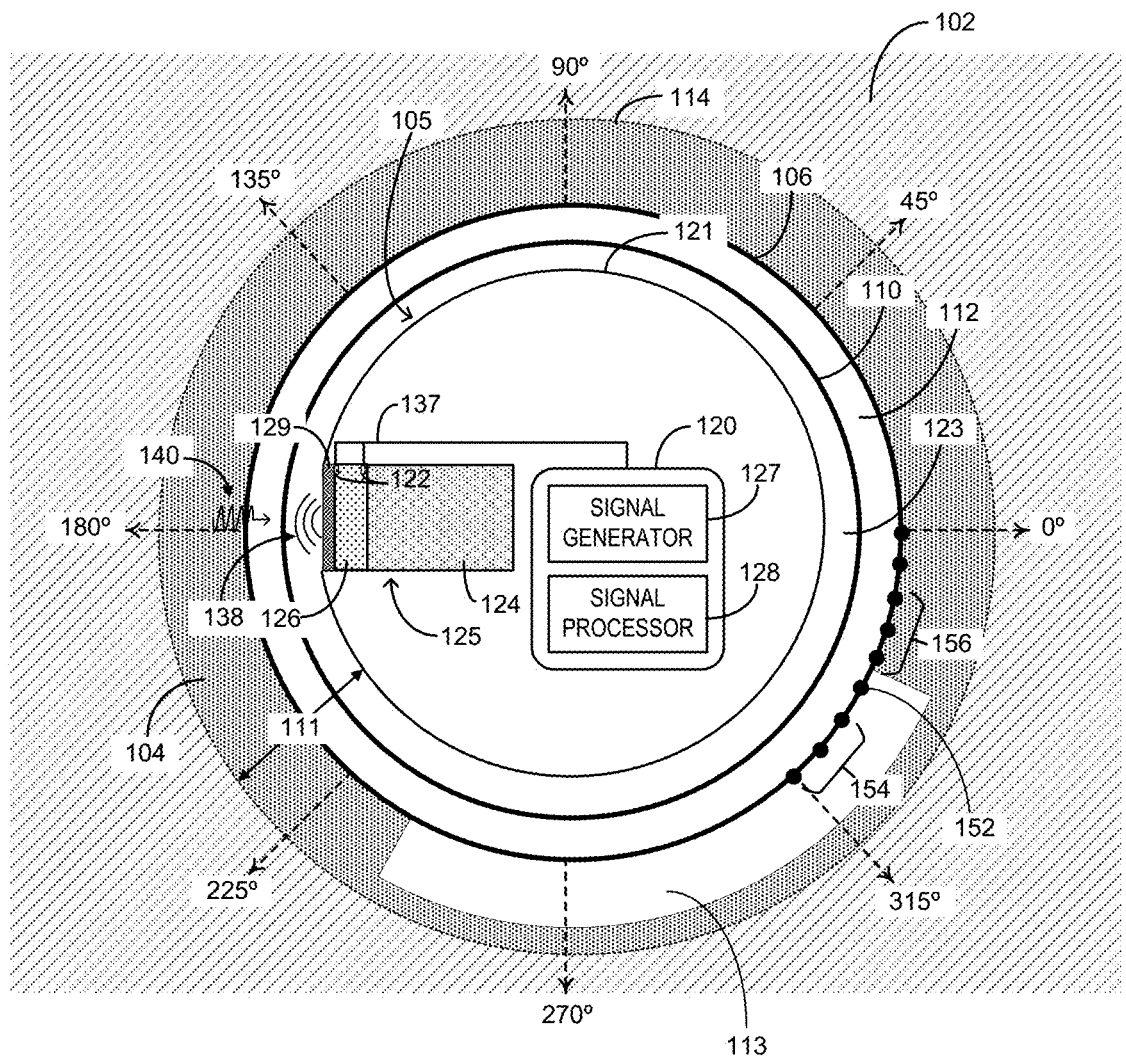
FIG. 1B is an overhead cross-section diagram depicting the acoustic logging tool depicted in FIG. 1A in accordance with some embodiments.

FIG. 1A depicts a side cross-section view of a downhole through tubing cement evaluation (TTCE) apparatus 100 that includes an acoustic logging tool 105 configured in accordance with some embodiments. FIG. 1B is an overhead cross-section diagram depicting TTCE apparatus 100 including acoustic logging tool 105 in accordance with some embodiments. As shown in FIGS. 1A and 1B (collectively, FIG. 1), acoustic logging tool 105 is deployed within a well that is defined by a wellbore 114 in which a production tubing 110 is installed within cement and metallic casing layers. Acoustic logging tool 105 is generally configured to induce acoustic echo responses and process the responses to determine material and structural properties of multiple material layers within wellbore 114. For example, the echo responses may comprise reflected and/or refracted acoustic waves generated when acoustic signals transmitted from acoustic logging tool 105 reflect and/or refract at acoustic impedance boundaries within and between the wellbore layers.

Wellbore 114 is formed within subsurface strata 102, such as may comprise a hydrocarbon formation in part, by drilling, and is typically filled with liquid and/or slurry substances such as water, reservoir fluids, etc. The outer perimeter of wellbore 114 is sealed from strata 102 by one or more barrier layers. For instance, a casing 106 comprises a metallic tubular member forming an inner liner that seals the interior of wellbore 114. To securely position casing 106 with respect to the inner surface of strata 102, a cement layer 104 is formed between casing 106 and the inner surface of strata 102 that bounds wellbore 114. Production tubing 110 is installed within the cylindrical interior space of casing 106 to form an innermost production conduit 117 and an annular space 112 that typically forms an annular fluid layer between the outer surface of production tubing 110 and the inner surface of casing 106.

Acoustic logging tool 105 includes a tool housing 121 within which an acoustic sensor 125 and a controller 120 are disposed. As shown in FIG. 1A, acoustic sensor 125 comprises an acoustic transmitter 116 and an acoustic receiver 118 within tool housing 121. Acoustic logging tool 105 is positioned within the innermost production conduit 117 in production tubing 110 with an additional annular fluid layer 123 formed in the annular space between the outer surface of tool housing 121 and the inner surface of production tubing 110. Acoustic logging tool 105 and its constituent components are movably disposed within a fluid column within and along the length of production conduit 117 via a conveyance means 115 such as may be a wireline or slickline. In some embodiments, acoustic sensor 125 may be configured with acoustic transmitter 116 and acoustic receiver 118 being individually contained and independently movable components. Alternatively, acoustic sensor 125 may be configured within a contiguous sensor housing such as depicted in FIG. 1 in which both transmitter 116 and receiver 118 are contained in a common tool housing 121.

Acoustic logging tool 105 comprises acoustic source/transmission components and acoustic detection and processing components within acoustic sensor 125. The transmitter and receiver components of acoustic sensor 125 are configured to measure acoustic responses, such as in the form of acoustic echoes, generated from acoustic source signals transmitted from acoustic transmitter 116 to various acoustic response target points within wellbore 114. In the depicted embodiment shown in FIG. 1B, acoustic sensor 125 comprises a transmitter and/or receiver that are configured as piezoelectric transducers that are electrically, optically, or otherwise communicatively coupled to controller 120. The overhead representation in FIG. 1B of acoustic sensor 125 may represent either a transmitter and/or a receiver, which may be distinct, axially offset components as shown in FIG. 1A.

As shown in FIG. 1B, acoustic sensor 125 includes a transducer comprising a piezoelectric material layer 126 and a pair of electrodes 122 coupled to a front side and a back side of piezoelectric material layer 126. An electrical or optical communication interface 137 provides electrical contact and connectivity between acoustic sensor 125 and controller 120. Acoustic sensor 125 further includes a backing material layer 124 disposed behind piezoelectric material layer 126. Backing material layer 124 comprises acoustic attenuation material such as ultrasonic attenuation material that is compositionally and structurally configured to attenuate acoustic waves emitted from the back side of the primary transducer. Acoustic sensor 125 further includes a protective cover layer 129 coupled to the radially outward front side of the transducer. Cover layer 129 forms a fluid impermeable seal preventing fluids from contacting the internal components of acoustic sensor 125. To minimize front side external acoustic reflection during signal transmission and internal acoustic reflection during reception of acoustic echoes, cover layer 129 may comprise a material having an acoustic impedance matching the acoustic impedance of the external acoustic medium, such as fluids within production conduit 117.

Controller 120 may be a programmable electronic module that is communicatively coupled to the piezoelectric transducer(s) of the transmitter/receiver components within acoustic sensor 125. Controller 120 is configured, using electronics and program code instructions, to provide excitation pulse signals to the transducer electrodes during pulse transmit periods that may comprise the excitation phase of measurement cycles. Controller 120 includes a signal generator 127 and a signal processor 128. Signal generator 127 is configured using any combination of hardware and/or program code constructs to generate and send excitation pulse signals to electrodes 122 via communication interface 137 that may include one or more electrical conduction paths. Signal processor 128 is configured using any combination of hardware and/or program code constructs to detect/ measure echo response signals received from receiver transducer electrodes via communication interface 137.

Signal generator 127 generates pulse signals comprising alternating current signals and corresponding voltage fluctuations that are applied to electrodes 122, resulting in fluctuating electrical fields and corresponding fluctuating electrical charges applied across piezoelectric layer 126 of the transducer within acoustic transmitter 116. Piezoelectric effect results in changes to mechanical stress and consequent mechanical deformation of piezoelectric layer 126. The mechanical deformation corresponds in terms of frequency and amplitude to the frequency and amplitude of the received electrical excitations signals, resulting in an ultrasonic vibration of piezoelectric layer 126. The ultrasonic vibration of piezoelectric layer 126 mechanically induces corresponding ultrasonic pressure waves within and across wellbore 114. The acoustic pressure waves generated by the transmitter transducer, such as sensor pulse 138, propagate through a wellbore annulus 111 that includes all the material layers and layer boundaries within wellbore 114. Sensor pulse 138 induces a corresponding acoustic echo signal 140 that results from reflection and/or refraction from various downhole acoustic boundaries within and at the boundaries between the various material layers within wellbore 114.

Sensor pulses, such as sensor pulse 138, are generated periodically, intermittently, or otherwise as part of individual measurement cycles. Each measurement cycle begins with an excitation phase during which signal generator 127 applies an electrical excitation that induces corresponding acoustic pulses in the transmitter transducer(s) to which the excitation is applied. Each measurement cycle further includes an echo response phase such as may be defined and implemented by signal processor components 128. During the echo response phase of each measurement cycle, signal processor components detect and process acoustic echo response signals such as signal 140 that are transduced by a receiver transducer from acoustic waves to an electrical acoustic response signal. The acoustic waves may comprise multiple wave types such as high order lamb waves.

TTCE analysis requires acoustic response information that is location-specific (e.g., along the cylindrical boundary between cement layer 104 and casing 106) as well as properties specific (e.g., density, structural characteristics). The multiple different material layers that may present acoustic barriers (reflectors and sinks) and varying ambient environmental conditions may present interference for or otherwise reduce accuracy of the acoustic measurements and particularly acoustic measurements for which the target response locations are outside of one or more of the wellbore tubulars such as production tubing 110 and casing 106. The acoustic measurement components of TTCE apparatus 100 are configured to implement efficient and accurate acoustic measurements of wellbore material properties with reduced reliance on removing internal acoustic barriers such as production tubing and casing. TTCE apparatus 100 is configured to collect and process acoustic response information in a manner that removes interference such as extraneous acoustic response information and sensor variations to enable more accurate representation of target acoustic response information such as material property transition information.

TTCE apparatus 100 is configured to collect and comparatively process symmetrically positioned acoustic responses to more precisely isolate intended acoustic response information such as acoustic response information indicating a material transition such as at the boundaries of a cement layer channel. To this end, acoustic transmitter 116 comprises an azimuthally directional transmitter such as a unipole transmitter that emits substantially unidirectional acoustic pulses. Additionally or alternatively, acoustic receiver 118 comprises an azimuthally directional receiver such as a unipole receiver that receives acoustic signal energy unidirectionally. In such embodiments, acoustic transmitter 116 and acoustic receiver 118 may be azimuthally co-aligned to enable maximum directional (e.g., unidirectional) acoustic response information that eliminates or substantially reduces measurement variability between azimuthally separated or axially separated measurements.

For a given measurement cycle, points for acoustic measurements by the directional acoustic transmitter/receiver pair may be included within a linear measurement path. The linear measurement path may correspond to one or more circumferential boundary lines at various radial distances from the center of wellbore 114. The individual measurement points are located along such a circumferential measurement path and measurements may be performed at and/or between such points by rotating acoustic sensor 125 azimuthally. In the depicted embodiment, measurement points may be included in a linear measurement path along the cylindrical contact interface at the outer metallic surface of casing 106.

For example, FIG. 1 illustrates multiple measurement points (depicted as dots) that are azimuthally distributed between 315° and 0°. The measurement points may be included in a circular/circumferential measurement path or in a spiral measurement path that includes gradual axial displacement. In alternate embodiments, measurement points may be distributed axially along a segment of the length of production tubing 115. In addition to the outer surface boundary of casing 106, measurement points may also be included between the inner and outer surfaces of cement layer 104 and or within other material layers or material boundaries within wellbore 114 such as with channel 113. All or most measurement points are located outside of production tubing 110 and some of the most important, such as cement-to-casing bond measurement points, are located outside of both production tubing 110 and casing 106.

As shown in FIGS. 1A and 1B, most of the outer surface of casing 106 is bonded with the cement in cement layer 104 except for the outer surface area over which a cement layer channel 113 is formed. Channel 113 may essentially comprise a void in the cement layer 104 that under downhole conditions may typically be filled with downhole fluids such as water, drilling fluid, reservoir fluid etc. As depicted and described in further detail with reference to FIGS. 2-10, TTCE apparatus 100 may be configured to collect and process acoustic measurements for identifying and characterizing channels such as channel 113. In particularly, acoustic measurements collected using a directional acoustic sensor may be processed to determine material transitions based on acoustic signature differentials between dissimilar material interfaces. TTCE apparatus 100 may be configured to collect acoustic measurements along a measurement path that may coincide with points at which cement layer 104 is bonded or otherwise in contact with the outer surface of casing 106 and points at which the cement void formed by channel 113 contacts the outer surface of casing 106. For example, the depicted measurement points depicted in FIG. 1 include points at which the cement layer 104 contacts the outer surface of casing 106 and points at which the fluid-filled void of channel 113 contacts the outer surface of casing 106.

Figure 2:
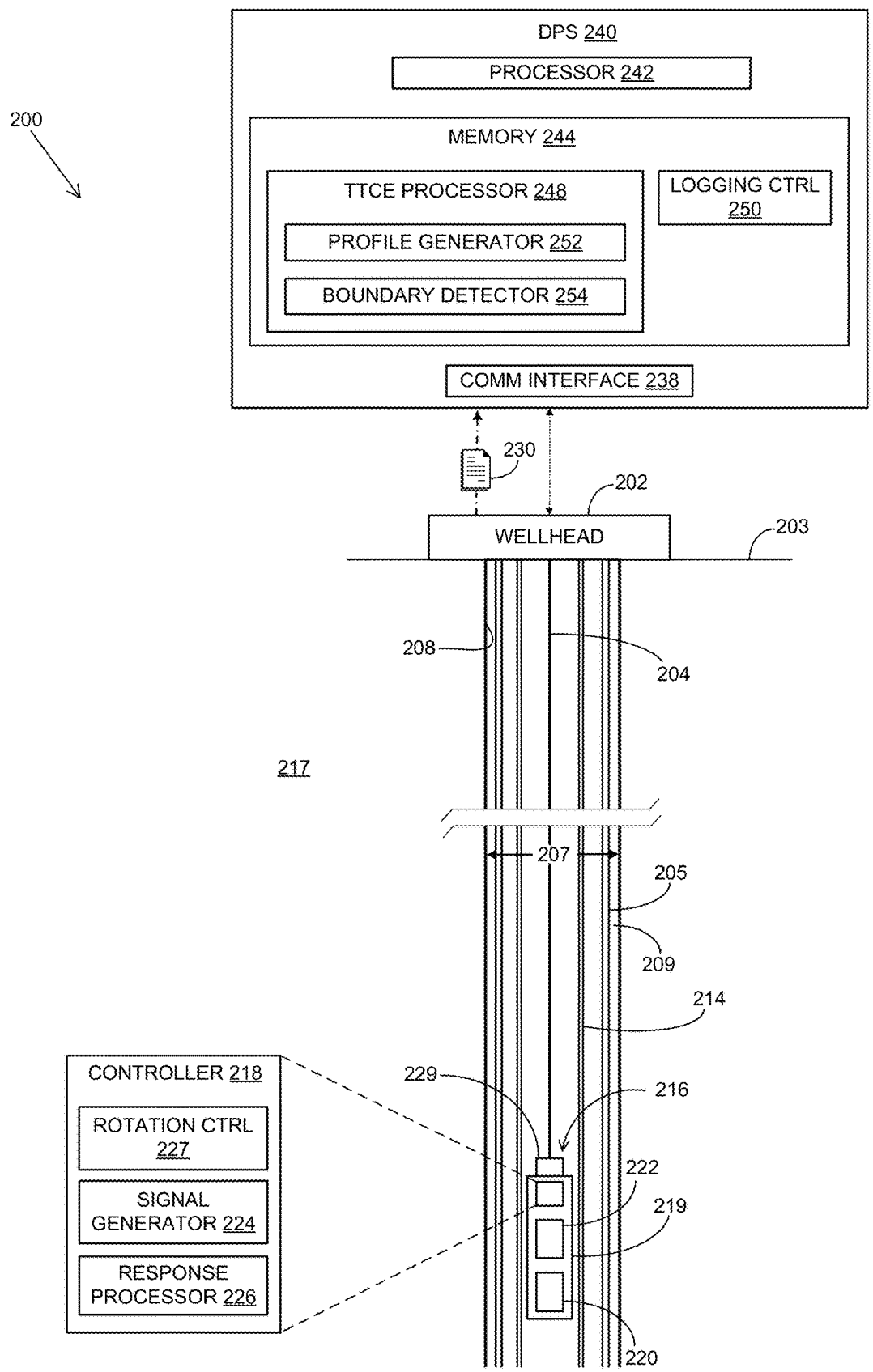
FIG. 2 is a high-level diagram depicting a well system that is configured to implement TTCE and other acoustic wellbore logging in accordance with some embodiments.

FIG. 2 is a high-level diagram depicting a well system 200 that is configured to implement TTCE and other acoustic wellbore logging in accordance with some embodiments. Well system 200 is particularly configured to address issues posed by TTCE, which entails measuring acoustic responses, such as acoustic echoes, generated by acoustic source signals that originate within an innermost tubing within a wellbore. Well system 200 includes subsystems, devices, and components configured to implement acoustic measurement testing procedures within a substantially cylindrical wellbore volume 207 that in the depicted embodiment is bounded and sealed by a casing 205. A cement layer 209 between casing 205 and an inner borehole wall 208 provides a protective seal that maintains structural and positional stability of casing 205. Well system 200 includes a wellhead 202 configured to deploy drilling and production and/or injection equipment such as drilling strings, production strings, etc. As shown, an interior tubing 214 is deployed within wellbore volume 207 and may comprise production tubing, drilling tubing such as drill pipes, injection tubing, or other type of tubing.

Wellhead 202 includes components for configuring and controlling deployment in terms of insertion and withdrawal of a test string within wellbore volume 207. The test string may be configured as a wireline test string deployed within interior tubing 214 and having a wireline cable 204 for moving and providing communication and power source connectivity for downhole test tools. In the depicted embodiment, wireline cable 204 is configured as the conveyance means for a logging tool 216 that includes an acoustic transmitter 220 and an acoustic receiver 222 disposed within a tool housing 219. Communication and power source couplings are provided to acoustic transmitter 220 and acoustic receiver 222 via wireline cable 204 having one or more communication and power terminals within wellhead 202.

Acoustic transmitter 220 and acoustic receiver 222 comprise components configured to implement acoustic measurement testing including TTCE testing. Acoustic transmitter 220 may be configured as an acoustic transducer as depicted in FIG. 1B that transmits acoustic pulses in a directional manner. Acoustic receiver 222 may comprise a directional hydrophone configured to detect acoustic echoes resulting from the acoustic signals transmitted by acoustic transmitter 220. Logging tool 216 further includes a controller 218 comprising components including a signal generator 224 and a response processor 226 for controlling acoustic measurement operations. Signal generator 224 is configured to generate electrical signals that are converted by acoustic transmitter 220 into acoustic waves emitted within wellbore 207. Response processor 226 is configured to measure acoustic responses by processing the converted acoustic wave information from acoustic receiver 222.

Logging tool 216 is coupled via a telemetry link within wireline cable 204 to a data processing system (DPS) 240. DPS 240 includes a communication interface 238 configured to transmit and receive signals to and from logging tool 216 as well as other devices within well system 200. Communication interface 238 uses a communication channel with wireline cable 204 as well as other telemetry links such as wireless electromagnetic links, acoustic links, etc. DPS 240 may be implemented in any of one or more of a variety of standalone or networked computer processing environments. As shown, DPS 240 may operate above a terrain surface 203 within or proximate to wellhead 202, for example.

DPS 240 includes processing, memory, and storage components configured to receive and process acoustic measurement information to determine material and structural properties and conditions within and/or external to the cylindrical volume defined by borehole wall 208. DPS 240 is configured to receive acoustic response data from logging tool 216 as well as from other sources such as surface test facilities. The acoustic data received from logging tool 216 includes echo response signals detected by acoustic receiver 222. DPS 240 comprises, in part, a computer processor 242 and a memory device 244 configured to execute program instructions for controlling measurement cycles and processing the resultant echo response signals to determine wellbore material properties such as material transitions that occur at the boundaries between dissimilar materials. Such properties and structural attributes may include but are not limited to cement structural integrity and the state of adhesion of the bonding between cement layer 209 and casing 205. For example, the cement condition may be characterized in terms of a lack of cement bond at one or more points on the external surface of casing 205. Such lack of cement and/or cement bond indicates a void within the cement layer 209 referred to as a channel.

DPS 240 includes program components including a TTCE processor 248 and a logging controller 250. TTCE processor 248 includes program components and data configured to process acoustic response data received from logging tool 216. Logging controller 250 includes program components and data configured to coordinate and otherwise control positioning and repositioning of logging tool 216 within and along the length of interior tubing 214, as well as the acoustic measurement procedures at each position. Loaded and executing within memory 244, TTCE processor 248 is configured to receive and process acoustic response data such as logging data 230.

The components within DPS 240 and the test string interoperate to implement acoustic measurement collection and processing in a manner enabling optimal accuracy of through tubing material evaluation. A next acoustic measurement cycle may begin with positioning of logging tool 216 at a next axial location along the length of interior tubing 214. At the next axial location, logging tool 216 may be rotationally positioned to an initial specified azimuthal angle. In the depicted embodiment, logging tool 216 may be rotated via controlled actuation of a DC motor 229. For example, a rotation controller 227 may be incorporated within controller 218 and be configured to azimuthally position logging tool 216, and more specifically the transmitter/receiver acoustic sensor components within logging tool 216, to a specified initial measurement azimuth angle based on instructions from logging controller 250.

The measurement cycle may continue with logging tool 216 measuring an acoustic response at the initial azimuthal angle. For TTCE logging, the overall acoustic response includes an echo response window in which echo signal characteristics profile material and structural characteristics of the cement-to-casing bonding at the azimuth angle. Following the initial azimuth measurement, logging tool 216 is repositioned to measure an acoustic response at a next point location along a linear measurement path that may be determined programmatically. The linear measurement path may be circumferential so that logging tool 216 is rotated by incremental azimuthal angles along a full 360° measurement path. Alternatively or additionally, the linear measurement path may be a substantially straight-line path so that logging tool 216 is linearly translated along a pre-determined axial length of interior tubing 214. In some embodiments, the linear measurement path may be a fully or partially spiral path combining azimuthal and axial offsets between each sequential measurement point/location. Regardless of the contour of the linear measurement path, the measurements at each point may be nearly instantaneous due to the proximity of the cement layer target points such that the rotation of acoustic tool 216 between measurements may be intermittent or continuous.

The azimuthal acoustic responses are collected during a period over which the data at each of the azimuthal angles and/or axial locations is recorded in association with the location and at a time point within an overall measurement time series. Response processor 226 may be configured to collect the time-specific and position-specific information into a time series matrix to be sent to and processed by DPS 240. In some embodiments, the matrix includes M columns and N+1 rows wherein M is the number of measurement positions separated by, for example, an azimuthal increment $\theta=360°/M$, and N+1 is the number of time increments $\Delta t$ over a total measurement period T such that $N+1=T/\Delta t$. For example, acoustic response data 230 may comprise a time series data matrix such as generated by logging tool 216. The matrix may include $M=(360/d\theta)$ measurement positions at azimuthal angles of 0°, dθ, 2dθ . . . 360°−dθ, at which a series of N+1 time series measurements are performed.

The measured acoustic response data such as in the time series matrix format is received and processed by TTCE processor 248. TTCE processor 248 is configured using program instructions and data to process the acoustic response data to determine differential signal data that eliminates unnecessary and potentially interfering acoustic signal components that correspond with non-targeted material layers and structures within the wellbore. In the depicted embodiment, TTCE processor 248 includes a profile generator 252 and a boundary detector 254.

Profile generator 252 is configured, using any combination of program instructions and data, to determine material transition profiles based by comparatively processing the time series measurements along linear measurement paths. A material transition profile may be one or more values associated with one or more points for which a material transition characteristic is determined. The points for which material transition profiles are determined may be referred to as test points and are located within a linear measurement path. Such test points may or may not correspond with one or more of the measurement points within a linear measurement path. Boundary detector 254 is configured, using any combination of program instructions and data, to identify or otherwise determine the spatial position of material transition boundaries such as the boundaries of a cementing channel within cement layer 209.

A given measurement cycle for well system 100 may begin with a directional acoustic sensor comprising acoustic transmitter 220 and acoustic receiver 222 acquiring acoustic measurement signals along a linear measurement path. For example, the linear measurement path may be a circumferential path along or proximate to the outer surface of casing 205. During the measurement cycle, acoustic transmitter 220 and acoustic receiver 222 are simultaneously rotated azimuthally to perform the acoustic measurements at each increment dθ, until the full 360° measurement path is completed. For each measurement point at a given angle ndθ, amplitudes of the received signals are recorded every dt, starting at t=0, over a total period of T generating a time series having $N+1=T/\Delta t$ elements. A total $M=360°/d\theta$ time series measurements are acquired along the measurement path. The measurement data may be configured and processed by profile generator 252 as a data matrix having M columns and N+1 rows.

Profile generator 252 further processes the measurement data matrix by isolating a target acoustic response window. For instance, profile generator 252 may be programmed to define a target acoustic response window $T'=[\zeta_0-\zeta_1]$ that is a subset of measurement period T. The target acoustic response window is isolated by isolating the time series measurement data for each of the M measurement points within T' to generate a sub-matrix A'. Profile generator 252 processes the M time series data within the target acoustic response window to extract one or more features that may be comparatively processed to identify or otherwise determine characteristics of material transitions. The extracted feature may be a time domain or frequency domain feature, for instance, the extracted feature may be the raw amplitude measurement data for each of the M time series. Alternatively, the extracted feature may comprise a Fast Fourier Transform parameter, an autocorrelation function characteristic, a sample entropy value, a Lyapunov exponent, etc.

Profile generator 252 is configured to define a number of test points within the linear measurement path for which a material transition characterization is to be computed. For instance, the test points may be defined as corresponding to the M measurement points, to a subset of the measurement points, and/or to points between measurement points. Profile generator 252 is further programmed to classify some or all of the time series in A' for the M measurement points in terms of proximity (e.g., adjacency) to one or more of the test points within the linear measurement path. In some embodiments, the measurement points most closely adjacent on each opposing side of a test point are classified as adjacent neighbors of the test point. In some embodiments, adjacent neighbors may be classified/defined as a set of two or more sequentially adjacent measurement points on one side of a test point and a geometrically symmetric set of two or more sequentially adjacent measurement point on the other side of the test point. For instance, and referring to FIG. 1B in conjunction with FIG. 2, the depicted circumferential measurement path along the surface of casing 106 between 0° and 315° includes a test point 152, which itself may also be a measurement point. Corresponding to test point 152, profile generator 252 may classify a first set of sequentially adjacent measurement points 154 and a second set of sequentially adjacent measurement points 156.

Profile generator 252 determines a material transition profile for each test point by comparatively processing the extracted features of the adjacent neighboring measurement points. For embodiments classifying a single nearest neighbor on each of the two sides of a test point, profile generator 252 determines the material transition profile as a difference between the extracted feature (e.g., raw amplitude value) of the time series measurements for the nearest neighbors. For embodiments classifying a set of two or more sequentially adjacent neighbors on each of the two sides of a test point, profile generator 252 calculates an average value for the extracted features for each of the two sets of adjacent neighbors. Profile generator 252 determines the material transition profile for the test point by comparing the average values to compute a response differential between the sequentially adjacent sets. In some embodiments, the response differential may be computed as an error difference between a norm of the average value of one set of sequentially adjacent measurements and a norm of the average of the other neighboring set.

The material transition profile data generated by profile generator 252 is processed by boundary detector 254 to affirmatively identify and characterize the position of material boundaries such as edge boundaries of cementing channels. In some embodiments, boundary detector 254 is configured to comparatively process the material transition profile values for each of the test points with respect to a threshold value and/or with respect to material transition profile values of other test points. For example, boundary detector 254 may be configured to process the error differences to determine, for each test point, whether a threshold requirement is satisfied (e.g., error difference exceeds a threshold value). The threshold comparison may be used to determine test points are at or within a range of a material transition edge boundary. Boundary detector 254 may further compare the error difference values of some or all the test points to determine one or two maximum values that correspond more precisely to the position of material transition boundaries.

Figure 3:
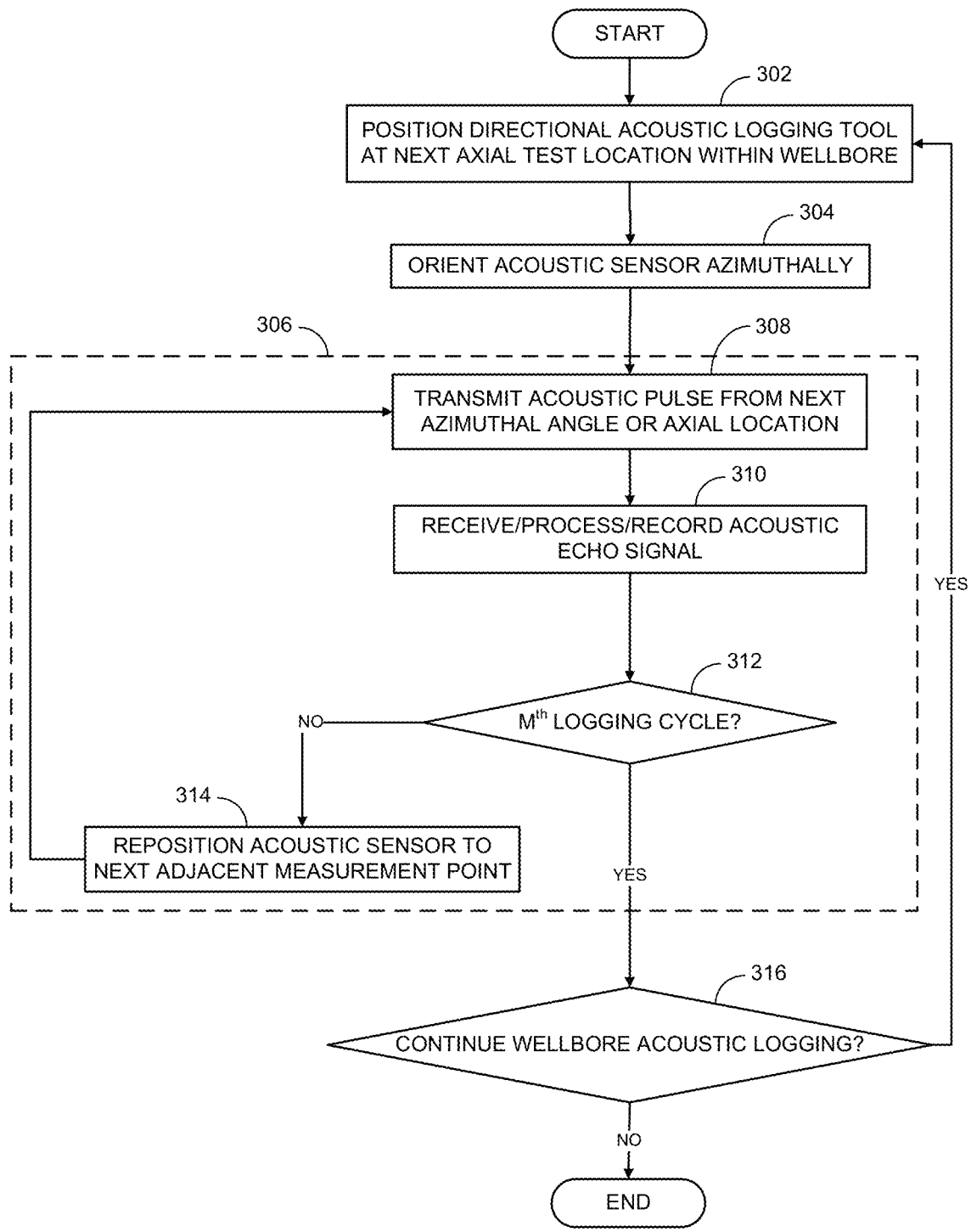
FIG. 3 is a flow diagram illustrating operations and functions for collecting linear path measurements to be used for determining downhole material transitions.

FIGS. 3-10 depict example operations that may be performed such as by the components shown in FIGS. 1A, 1B, and 2 during material transition detection and characterization. FIG. 3 is a flow diagram illustrating operations and functions for collecting linear path measurements to be used for determining downhole material transitions. The process begins as shown at block 302 with a test string and/or logging controller positioning a directional acoustic logging tool at a next axial location within a wellbore. For example, the acoustic logging tool may comprise a unipole (i.e., unidirectional) transmitter and unipole receiver and the test string controller may linearly translate the logging tool within an innermost wellbore conduit that is concentrically centered within multiple material layers include metallic tubing (e.g., production tubing and outer casing), fluid layers, and a cement layer.

At block 304, a logging tool controller such as may include a DC motor positions/orients the transmitter/receiver sensor components of the logging tool to a specified measurement angular position. Following initial axial and azimuthal positioning, the logging system executes an acoustic measurement sequence at block 306. The acoustic measurement cycle begins at block 308 with the directional transmitter transmitting an acoustic pulse from the current axial and azimuthal sensor location. At block 310, the acoustic receiver within the logging tool that is also aligned at the specified azimuthal angle receives an acoustic echo response that may be further processed such as by a TTCE processor to isolate a cement-to-casing acoustic response from within the overall response. The measurement is recorded as a time series having N+1 measurement recording samples. The time series measurement is recorded as an entry in a data matrix such as matrix 400 depicted in FIG. 4A. Matrix 400 comprises time series acoustic response values measured along a specified linear measurement path that in the depicted example is a circumferential/azimuthal path covering 360°. In the depicted example, the measurement path includes M=360°/θ measurement points and (N+1) recorded measurement samples over a measurement period T at each point where N=T/dt.

The acoustic measurement sequence continues as shown at block 312 with a determination of whether the full measurement cycle (i.e., measurements at all M point locations along a linear measurement path) has been completed. If not, control passes to block 314 with the logging controller repositioning the acoustic sensor components to the next measurement point. For example, if the linear measurement path is circumferential, the logging controller rotates the acoustic logging tool by a specified azimuthal increment angle θ=360°/M, wherein M represents the number of azimuthal locations at which the acoustic logging tool measures acoustic responses. More specifically, the acoustic tool rotation includes rotating the directional transmission face of the acoustic transmitter and the directional receiving face of the acoustic receiver to the next azimuthal angle position. Typical azimuth rotation increments may be 2° or 5° for example. If the linear measurement path is linear, the logging controller linearly translates the acoustic sensor to the next axially adjacent measurement point. If the linear measurement path is helical, the logging controller repositions the acoustic sensor components to the next adjacent azimuthal and axial position within the path. The measurements at each measurement point may be nearly instantaneous due to the proximity of the specified target points to the acoustic transmitter and receiver such that the rotation of the acoustic tool between measurements may be intermittent or continuous.

Figures 4A, 4B:
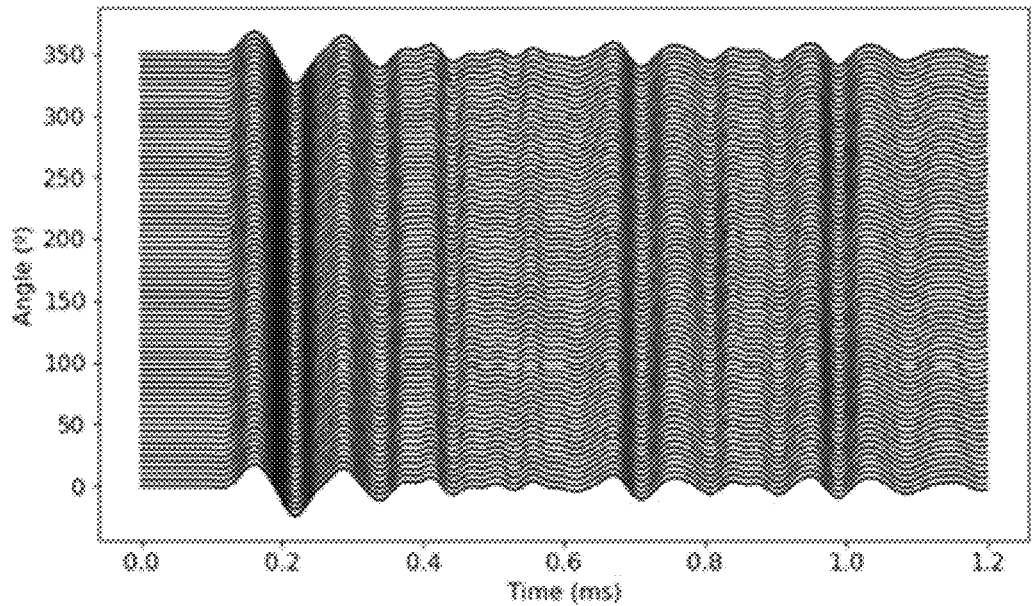
FIG. 4A depicts an example data matrix comprising time series acoustic response values measured along a linear measurement path within a wellbore.
FIG. 4B is a graph showing time series measurement data recorded for linear measurement path defined by azimuthal angle.

Control returns to block 308 and a next measurement sequence begins following repositioning. In response to all M measurements completed as determined at block 312, control passes to block 316 with the acoustic logging system determining whether to continue logging. If so, control passes back to block 302 and if not, the process ends. The acoustic response measurement results may be mapped as time series data such as depicted in FIG. 4B. Specifically, FIG. 4B illustrates acoustic measurement data 450 that is mapped as signal strength (amplitude) as the level of shading over as a time series and azimuthal angle matrix consistent with the azimuthal measurements depicted in FIG. 4A.

Figure 5:
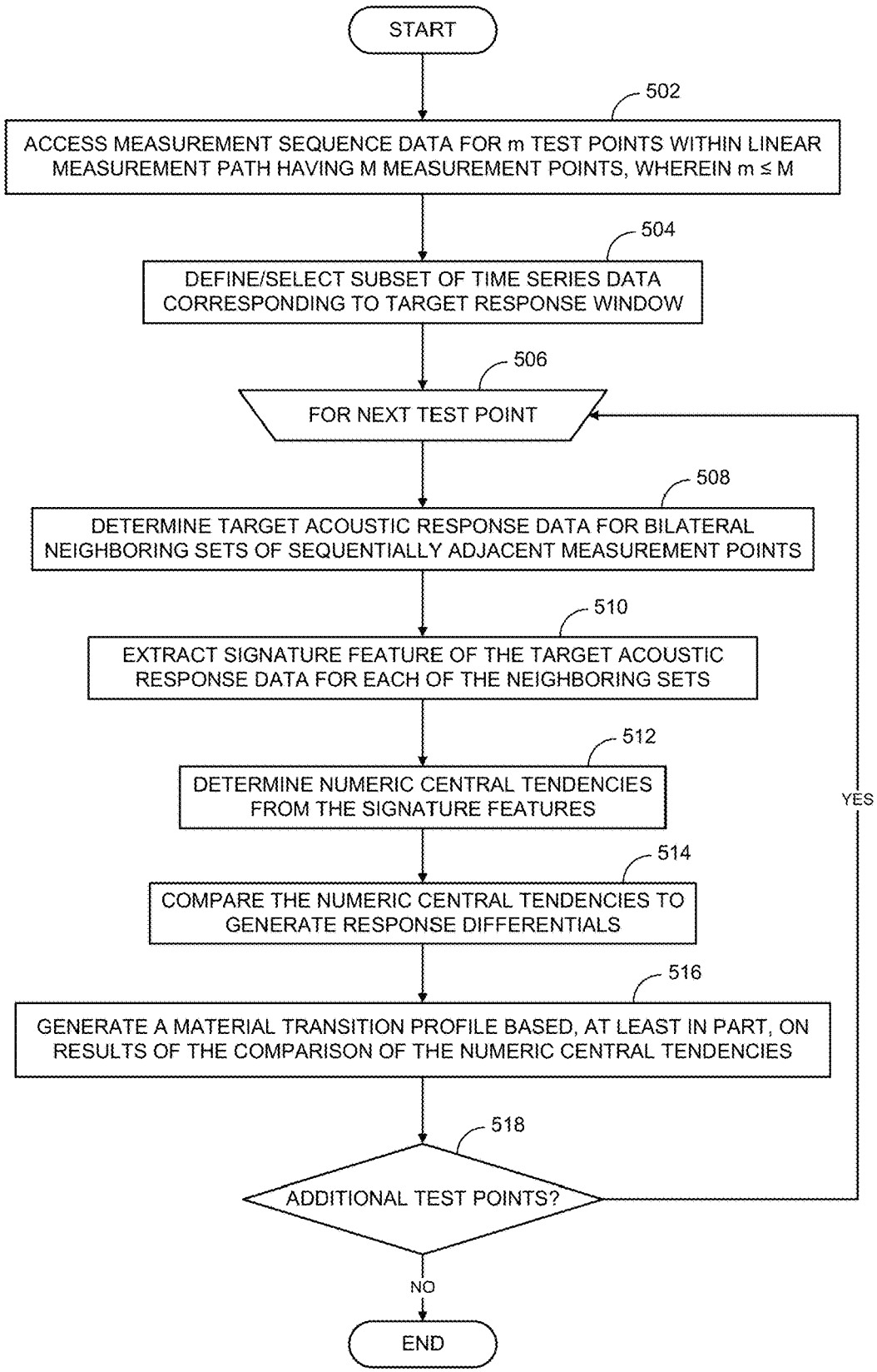
FIG. 5 is a flow diagram depicting operations and functions for generating material transition profiles in accordance with some embodiments.
Figures 6A, 6B:
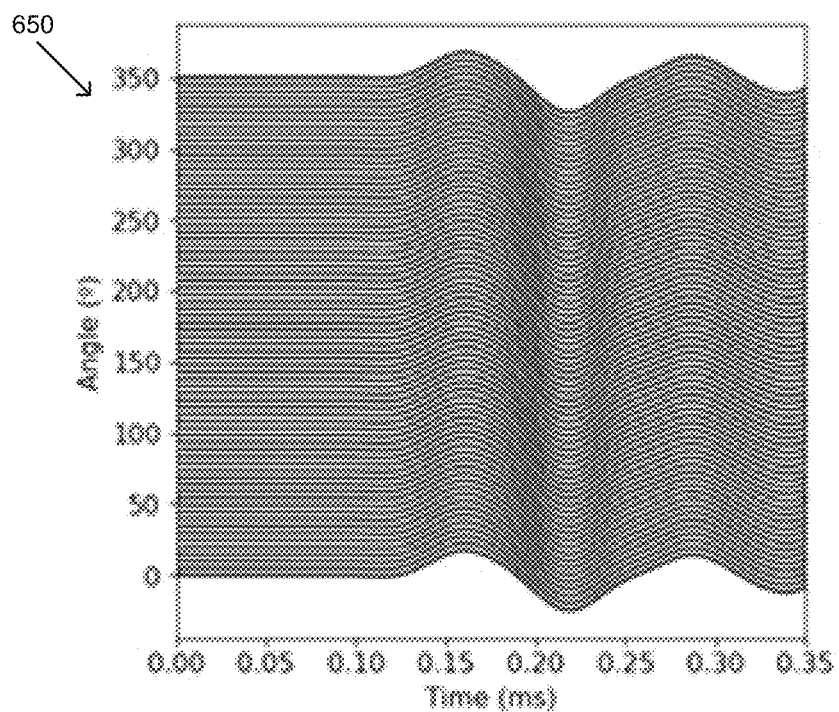
FIG. 6A illustrates an example data matrix comprising a subset of time series acoustic response values corresponding to a target response window.
FIG. 6B is a graph showing time series measurement data recorded for a linear measurement path defined by azimuthal angle and within a target response window.

The acoustic measurement data mapped as a time series by measurement point position/angle is further processed to provide a location-based reference enabling efficient and accurate correlation of measurement results to wellbore material properties at specified target locations such as the boundaries of cementing channels. FIG. 5 is a flow diagram depicting operations and functions for generating material transition profiles based on the collected acoustic response data. The process begins as shown at block 502 with a TTCE processor retrieving or otherwise accessing acoustic measurement data such as matrix 400 in FIG. 4A. The measurement data comprises time series acoustic measurement performed for multiple measurement points within a linear measurement path that includes test points that may or may not coincide with the measurement points.

At block 504, a profile generator selectively isolates or otherwise defines a subset of the time series data corresponding to a specified target response window. Such a transition profile generator may be incorporated within or statically or dynamically linked with a TTCE processor as depicted in FIG. 2. The target acoustic response window is isolated by isolating the time series measurement data for each of the M measurement points within T' to generate a sub-matrix such as a sub-matrix 600 depicted in FIG. 6A. Sub-matrix 600 may be generated by extracting a subset of the time series data within matrix 400 in FIG. 4A. In the depicted embodiment, the profile generator extracts or otherwise isolates the time series data to define a target acoustic response window T'=[$\zeta_0$–$\zeta_1$] that is a subset of measurement period T for each for each of the measurement points. The target response window results may be mapped as time series data such as depicted in FIG. 4B. Specifically, FIG. 4B illustrates acoustic measurement data 650 that is mapped as signal strength (amplitude) as the level of shading over as a time series and azimuthal angle matrix consistent with the azimuthal measurements depicted in FIG. 6A.

Figure 7:
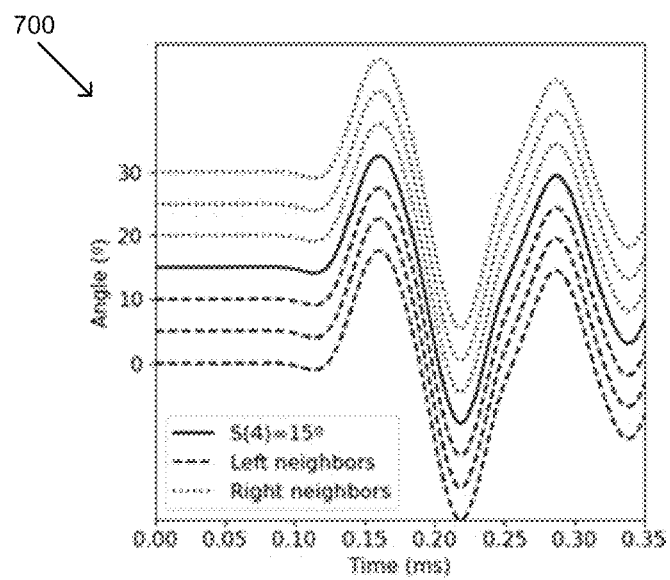
FIG. 7 is a graph showing target acoustic response data for bilateral neighboring sets of sequentially adjacent measurement points.

At block 506, the profile generator begins a processing sequence for computing material transition profiles for a next of the m test points among the M measurement points. At block 508, the profile generator determines, from the sub-matrix, target acoustic response data corresponding to bilateral neighboring sets of sequentially adjacent measurement points for the next test point. The composition of neighboring sets of sequentially adjacent measurement points may or may not be pre-configured within the profile generator. The neighboring sets may each comprise a single measurement point on either side of and relatively adjacent to (e.g., within 5° of) the test point. In some embodiments, the neighboring sets may each comprise two or more sequentially adjacent points with the test point substantially centered between the neighboring sets. For example, FIG. 7 is a graph showing target acoustic response data 700 for bilateral neighboring sets of sequentially adjacent measurement points. As depicted, the test point coincides with a time series measurement depicted as a solid line. One set of neighboring measurements are collected at 5° increments to form a set of sequentially adjacent points spanning from 20° to 30°, with the set offset by 5° from the test point at 15°. The other set of neighboring measurements are collected at 5° increments to form a set of sequentially adjacent points spanning from 10° to 0°, with the set offset by 5° from the test point.

Having selected the target acoustic response window data for the neighboring sets, the profile generator extracts a signature feature of the target acoustic response data for each of the sets (block 510). For example, the signature feature may comprise the raw measurement data for the measurement points within the neighboring sets such as recorded in FIG. 6A and mapped in FIG. 6B. In some embodiments, the signature feature of the time series for each of the neighboring sets measurement points may be generated from the raw measurement data by executing a time series processing algorithm that may generate time domain and/or frequency domain results. For example, the signature feature may be computed by processing the raw measurement data using a Fast Fourier Transform, an autocorrelation function, a sample entropy algorithm, a Lyapunov exponent algorithm, etc.

Figure 8A:
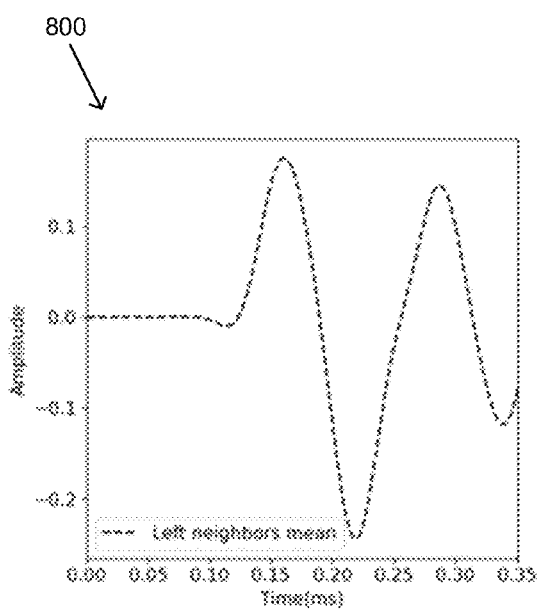
FIG. 8A is a graph showing a numeric central tendency determined from the signature features of the left sequentially adjacent neighboring measurements.
Figure 8B:
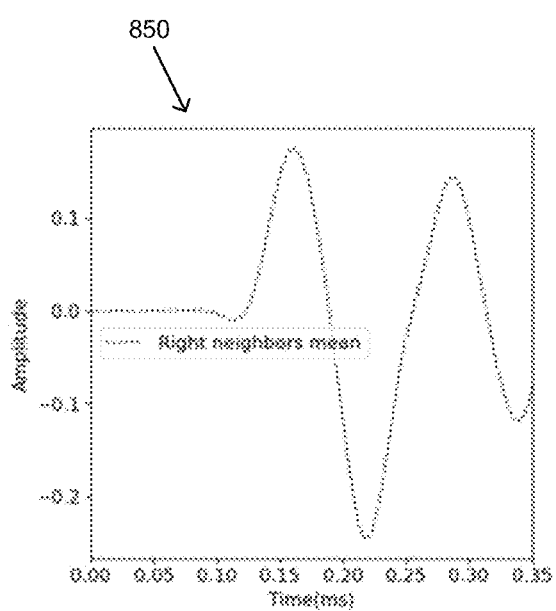
FIG. 8B is a graph showing a numeric central tendency determined from the signature features of the right sequentially adjacent neighboring measurements.

At block 512, the profile generator calculates or otherwise determines a numeric central tendency for each of the neighboring sets based on the signature features. For example, the profile generator may calculate an average value such as a mean value, a median value, or a mode value of the signature features of each of the neighboring sets. For example, FIG. 8A is a graph showing a numeric central tendency calculated as a mean of the signature features of a left sequentially adjacent neighboring set and FIG. 8B is a graph showing a numeric central tendency calculated as a mean of the signature features of a right sequentially adjacent neighboring set.

At block 514, the profile generator compares the numeric central tendencies of each of the neighboring sets to generate one or more response differential values. In some embodiments, the profile generator may compare the numeric central tendencies by computing a norm of each of the numeric central tendencies and generating the response differential value as a difference between the computed norms. At block 516, the profile generator generates a material transfer profile based, at least in part, on the results of the comparison of the numeric central tendencies at block 514. For example, the profile generator may determine the material transfer profile value as a difference between the numeric central tendencies. If, as determined at block 518, additional test points remain for which material transition profiles remain to be generated, control passes back to block 506 to determine the profile value for the next test point within the linear measurement path.

Figure 9:
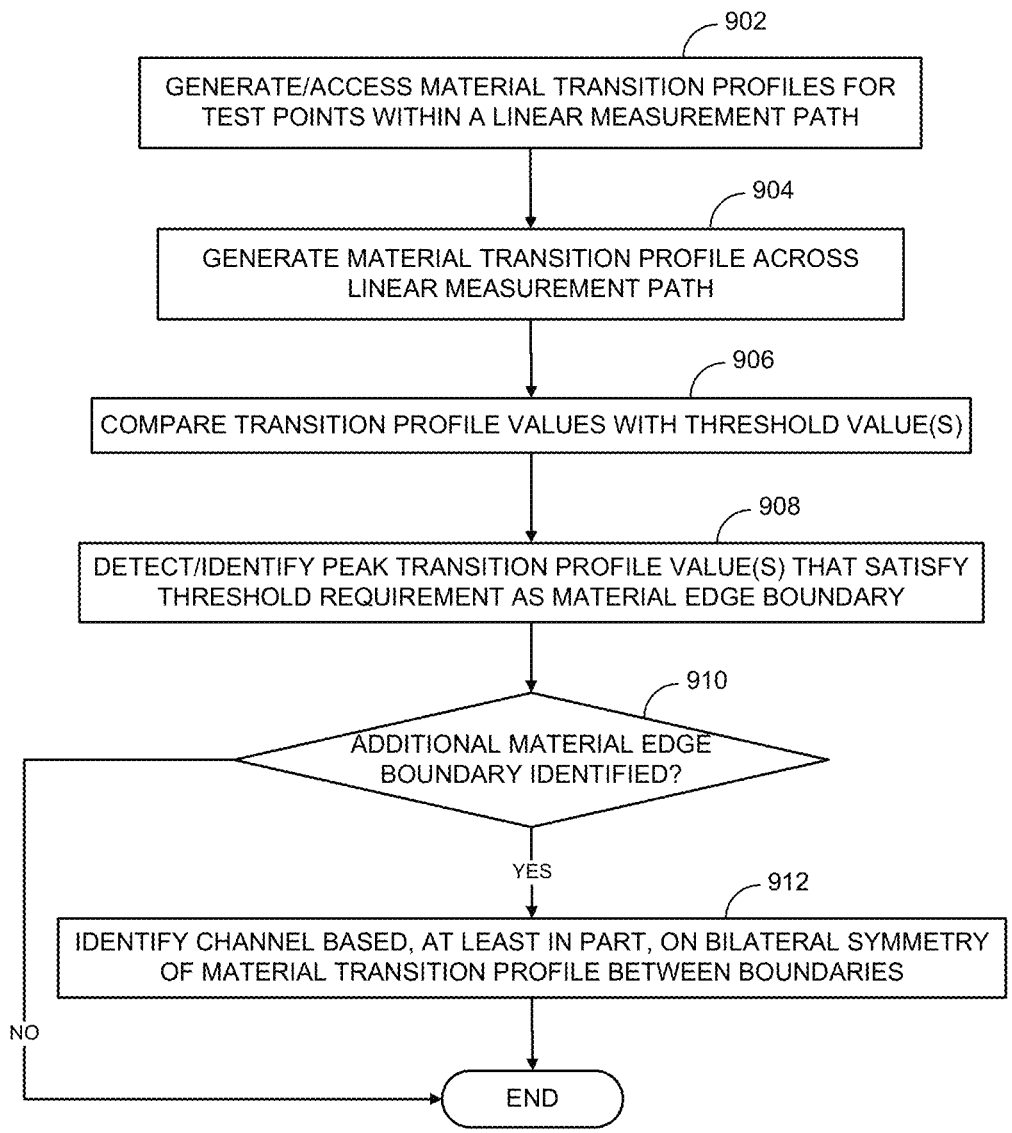
FIG. 9 is a flow diagram illustrating operations and functions for using material transition profiles to detect, identify, and otherwise characterize cement layer channels.
Figure 10:
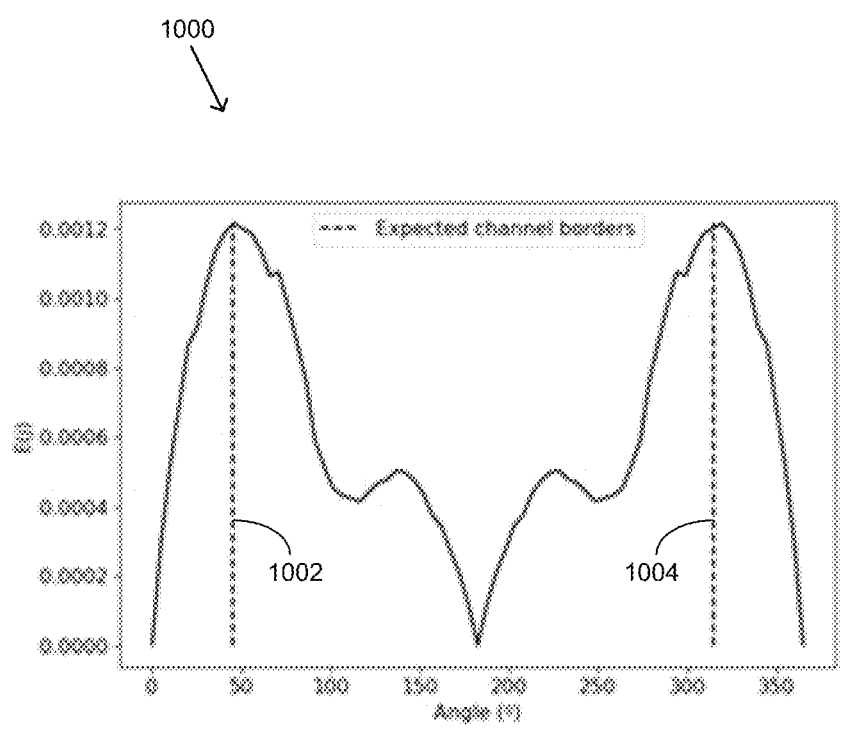
FIG. 10 is a graph showing material transition profile values plotted across a linear measurement path.

FIG. 9 is a flow diagram illustrating operations and functions for using material transition profiles to detect, identify, and otherwise characterize cement layer channels. The process begins as shown at block 902 with a boundary detector component accessing the material transition profile data for each of the test points within a given linear measurement path. Such a boundary detector may be incorporated within or statically or dynamically linked with a TTCE processor as depicted in FIG. 2. At block 904, the boundary detector may optionally generate a material transition profile for across the path by plotting or otherwise mapping each of the transition profile values with a given displacement and/or angular positional value indicating location within the linear measurement path. For example, FIG. 10 is a graph showing material transition profile values 1000 plotted across an angular/azimuthal measurement path that corresponds to a linear circumferential measurement path within which the target measurement points are located.

At block 906, the boundary detector may implement a thresholding algorithm wherein, for example, the boundary detector compares the transition profile values with a threshold value. For embodiments in which the transition profile values comprise response differential values generated as differences between neighboring set numeric central tendencies, the boundary detector may compare the response differential values with a threshold value to determine which, if any, of the test points may be at or near as a material transition boundary such as a channel edge boundary (block 908). Also at block 908, and as an alternative or additional and superseding criterion for boundary detection, the boundary detector comparatively processes the set of all transition profile values across the linear measurement path or the subset of transition profile values that satisfy the threshold requirement. For example, the boundary detector may identify one or more test points corresponding to the largest transition profile value with the set as a material edge boundary. If more than one material edge boundary is detected at block 908, the boundary detector may identify a channel such as a channel within a cement layer based, at least in part, on bilateral symmetry of the material transition profile such as mapped at block 904 between the detected boundaries. For example, the cross-path material transition profile 1000 shown in FIG. 10 depicts a bilateral symmetry of the test point response differentials between a first detected material transition boundary 1002 and a second detected material transition boundary 1004.

Example Computer

Figure 11:
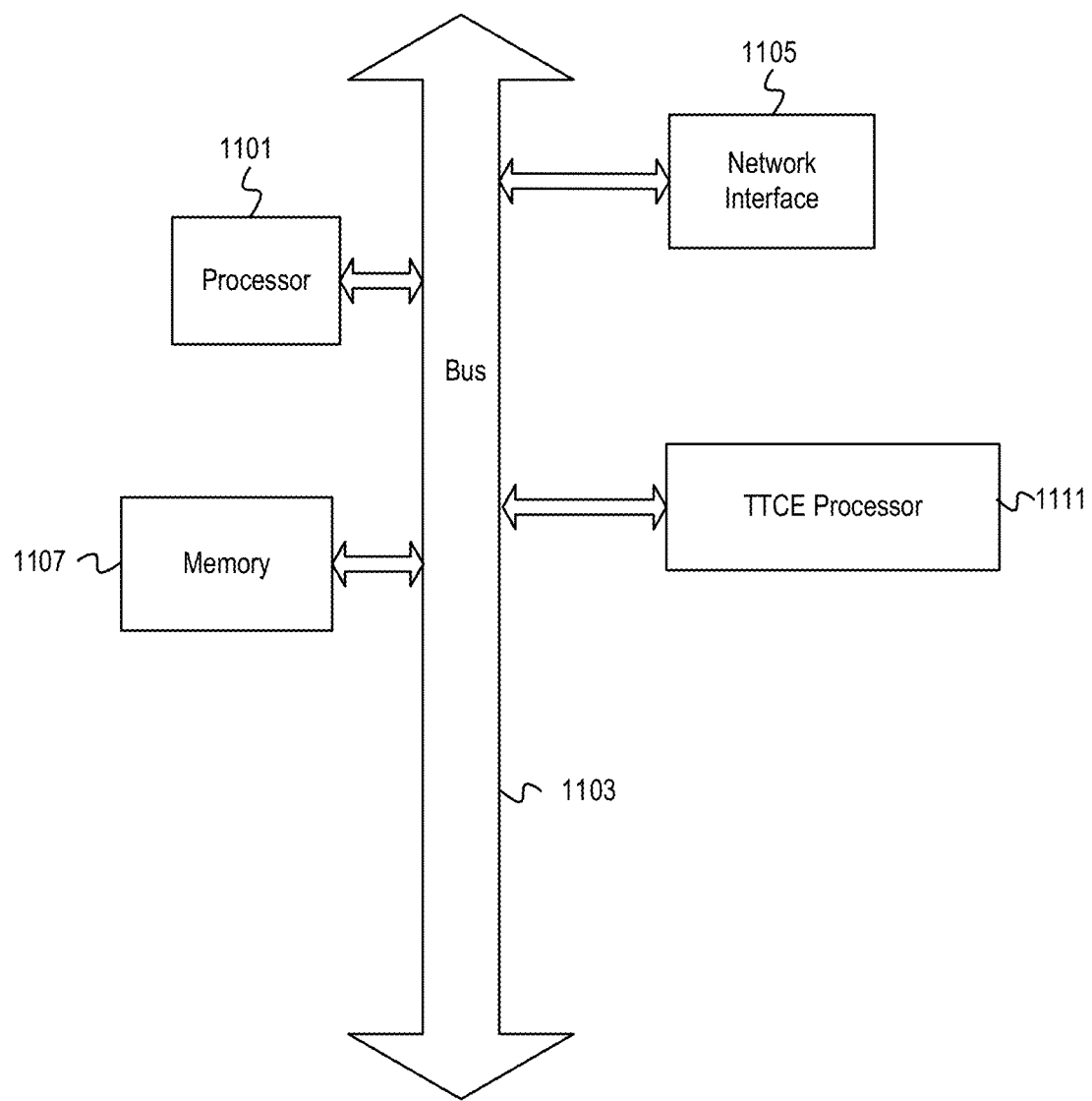
FIG. 11 depicts a computer system configured to implement the systems and methods depicted and described with reference to FIGS. 1-10.

FIG. 11 depicts an example computer system, according to some embodiments. The computer includes a processor 1101. The computer includes memory 1107, a bus 1103, and a network interface 1105 (e.g., a wireless interface, interface for a wired connection, etc.). The computer also includes an acoustic response processor 1111. Acoustic response processor 1111 may be configured to perform the different signal processing as described above. Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11. The processor 1101 and the network interface 1105 are coupled to the bus 1103. Although illustrated as being coupled to the bus 1103, the memory 1107 may be coupled to the processor 1101.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can store a program for use by or in connection with an instruction execution system, apparatus, or device.

Program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure. As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Embodiment 1: A method for determining material transitions within a wellbore, said method comprising: determining a material transition profile for each of a plurality of test points within a linear measurement path including, for each test point, determining an acoustic response for a first location within the linear measurement path; determining an acoustic response for a second location within the linear measurement path, wherein the test point is between the first and second locations; and generating a material transition profile for the test point based, at least in part, on a difference between the acoustic response at the first location and the acoustic response at the second location. The method may further comprise performing acoustic measurements to determine the acoustic response at the first location and the acoustic response at the second location including: positioning a directional acoustic sensor at a first azimuthal or axial position within the wellbore; measuring an acoustic response time series at the first azimuthal or axial position; repositioning the directional acoustic sensor to a second azimuthal or axial position by at least one of rotating the directional acoustic sensor azimuthally or linearly translating the directional acoustic sensor axially; and measuring an acoustic response time series at the second azimuthal or axial position. Determining an acoustic response for the first location may comprise collecting acoustic responses for a first plurality of sequentially adjacent points along the linear measurement path, determining an acoustic response for the second location may comprise collecting acoustic responses for a second plurality of sequentially adjacent points, and the test point may be between the first and second pluralities of sequentially adjacent points. The first plurality of sequentially adjacent points may be azimuthally offset from the second plurality of sequentially adjacent points. The first plurality of sequentially adjacent points may be axially offset along a length of the wellbore from the second plurality of sequentially adjacent points. Determining a material transition profile may include determining a first numeric central tendency derived from the acoustic responses for the first plurality of sequentially adjacent points; determining a second numeric central tendency derived from the acoustic responses for the second plurality of sequentially adjacent points; comparing the first and second numeric central tendencies; and generating a material transition profile based, at least in part, on a difference between the first and second numeric central tendencies. The first and second numeric central tendencies may comprise at least one of a mean value, a median value, and a mode value. Comparing the first and second numeric central tendencies may comprise: determining a norm of the first numeric central tendency; determining a norm of the second numeric central tendency; and comparing the norms of the first and second numeric tendencies. The method may further comprise identifying a material transition boundary in response to determining that one or more of the material transition profiles satisfy a threshold requirement. The method may further comprise determining material transition boundaries including identifying one or more material transition boundaries based, at least in part, on comparing the material transition profiles for the plurality of test points. The material transition profiles may comprise response differential values and said determining material transition boundaries may include: comparing the response differential values; and identifying one or more material transition boundaries as corresponding to one or more test points having a larger response differential value than response differential values of one or more other test points within the linear measurement path. The material transition boundaries may comprise cement layer channel boundaries, and said identifying one or more material transition boundaries may comprise: identifying a first material transition boundary corresponding to a first test point within the linear measurement path; identifying a second material transition boundary corresponding to a second test point within the linear measurement path; and identifying a channel between the first and second material transition boundaries based, at least in part, on a bilateral symmetry of material transition profiles for test points between the first and second material transition boundaries.

Embodiment 2: An apparatus comprising: a processor; and a computer-readable medium having instructions stored thereon that are executable by the processor to cause the apparatus to, determine a material transition profile for each of a plurality of test points within a linear measurement path including, for each test point, determining an acoustic response for a first location within the linear measurement path; determining an acoustic response for a second location within the linear measurement path, wherein the test point is between the first and second locations; and generating a material transition profile for the test point based, at least in part, on a difference between the acoustic response at the first location and the acoustic response at the second location.

The apparatus may further comprise a logging control system configured to perform acoustic measurements to determine the acoustic response at the first location and the acoustic response at the second location, said logging control system configured to: position a directional acoustic sensor at a first azimuthal or axial position within the wellbore; measure an acoustic response time series at the first azimuthal or axial position; reposition the directional acoustic sensor to a second azimuthal or axial position by at least one of rotating the directional acoustic sensor azimuthally or linearly translating the directional acoustic sensor axially; and measure an acoustic response time series at the second azimuthal or axial position. Determining an acoustic response for the first location may comprise collecting acoustic responses for a first plurality of sequentially adjacent points along the linear measurement path, determining an acoustic response for the second location may comprise collecting acoustic responses for a second plurality of sequentially adjacent points, and the test point may be between the first and second pluralities of sequentially adjacent points. The first plurality of sequentially adjacent points may be azimuthally offset from the second plurality of sequentially adjacent points. The first plurality of sequentially adjacent points may be axially offset along a length of the wellbore from the second plurality of sequentially adjacent points. Determining a material transition profile may include: determining a first numeric central tendency derived from the acoustic responses for the first plurality of sequentially adjacent points; determining a second numeric central tendency derived from the acoustic responses for the second plurality of sequentially adjacent points; comparing the first and second numeric central tendencies; and generating a material transition profile based, at least in part, on a difference between the first and second numeric central tendencies. The material transition profiles may comprise response differential values, and said instructions may further comprise instructions executable by the processor to cause the apparatus to determine material transition boundaries including: comparing the response differential values; and identifying one or more material transition boundaries as corresponding to one or more test points having a larger response differential value than response differential values of one or more other test points within the linear measurement path.

Embodiment 3: A non-transitory, computer-readable medium having instructions stored thereon that are executable by a computing device to perform operations comprising: determining a material transition profile for each of a plurality of test points within a linear measurement path including, for each test point, determining an acoustic response for a first location within the linear measurement path; determining an acoustic response for a second location within the linear measurement path, wherein the test point is between the first and second locations; and generating a material transition profile for the test point based, at least in part, on a difference between the acoustic response at the first location and the acoustic response at the second location.

The invention claimed is:

1. A method for determining material transitions within a wellbore, said method comprising:
   determining a material transition profile for each of a plurality of test points within a linear measurement path including, for each test point,
      determining an acoustic response for a first location within the linear measurement path;
      determining an acoustic response for a second location within the linear measurement path, wherein the test point is between the first and second locations; and
      generating a material transition profile for the test point based, at least in part, on a difference between the acoustic response at the first location and the acoustic response at the second location.

2. The method of claim 1, further comprising performing acoustic measurements to determine the acoustic response at the first location and the acoustic response at the second location including:
   positioning a directional acoustic sensor at a first azimuthal or axial position within the wellbore;
   measuring an acoustic response time series at the first azimuthal or axial position;
   repositioning the directional acoustic sensor to a second azimuthal or axial position by at least one of rotating the directional acoustic sensor azimuthally or linearly translating the directional acoustic sensor axially; and
   measuring an acoustic response time series at the second azimuthal or axial position.

3. The method of claim 1, wherein determining an acoustic response for the first location comprises collecting acoustic responses for a first plurality of sequentially adjacent points along the linear measurement path, wherein determining an acoustic response for the second location comprises collecting acoustic responses for a second plurality of sequentially adjacent points, and wherein the test point is between the first and second pluralities of sequentially adjacent points.

4. The method of claim 3, wherein the first plurality of sequentially adjacent points are azimuthally offset from the second plurality of sequentially adjacent points.

5. The method of claim 3, wherein the first plurality of sequentially adjacent points are axially offset along a length of the wellbore from the second plurality of sequentially adjacent points.

6. The method of claim 3, wherein determining a material transition profile includes:

determining a first numeric central tendency derived from the acoustic responses for the first plurality of sequentially adjacent points;

determining a second numeric central tendency derived from the acoustic responses for the second plurality of sequentially adjacent points;

comparing the first and second numeric central tendencies; and generating a material transition profile based, at least in part, on a difference between the first and second numeric central tendencies.

7. The method of claim 6, wherein the first and second numeric central tendencies comprise at least one of a mean value, a median value, and a mode value.

8. The method of claim 6, wherein said comparing the first and second numeric central tendencies comprises:

determining a norm of the first numeric central tendency;

determining a norm of the second numeric central tendency; and comparing the norms of the first and second numeric tendencies.

9. The method of claim 1, further comprising identifying a material transition boundary in response to determining that one or more of the material transition profiles satisfy a threshold requirement.

10. The method of claim 1, further comprising determining material transition boundaries including identifying one or more material transition boundaries based, at least in part, on comparing the material transition profiles for the plurality of test points.

11. The method of claim 10, wherein the material transition profiles comprise response differential values, and said determining material transition boundaries includes:

comparing the response differential values; and identifying one or more of the material transition boundaries as corresponding to one or more test points having a larger response differential value than response differential values of one or more other test points within the linear measurement path.

12. The method of claim 10, wherein the material transition boundaries comprise cement layer channel boundaries, and wherein said identifying one or more material transition boundaries comprises:

identifying a first material transition boundary corresponding to a first test point within the linear measurement path;

identifying a second material transition boundary corresponding to a second test point within the linear measurement path; and identifying a channel between the first and second material transition boundaries based, at least in part, on a bilateral symmetry of material transition profiles for test points between the first and second material transition boundaries.

13. An apparatus comprising:

a processor; and a computer-readable medium having instructions stored thereon that are executable by the processor to cause the apparatus to, determine a material transition profile for each of a plurality of test points within a linear measurement path including, for each test point, determining an acoustic response for a first location within the linear measurement path;

determining an acoustic response for a second location within the linear measurement path, wherein the test point is between the first and second locations; and generating a material transition profile for the test point based, at least in part, on a difference between the acoustic response at the first location and the acoustic response at the second location.

14. The apparatus of claim 13, further comprising a logging control system configured to perform acoustic measurements to determine the acoustic response at the first location and the acoustic response at the second location, said logging control system configured to:

position a directional acoustic sensor at a first azimuthal or axial position within a wellbore;

measure an acoustic response time series at the first azimuthal or axial position;

reposition the directional acoustic sensor to a second azimuthal or axial position by at least one of rotating the directional acoustic sensor azimuthally or linearly translating the directional acoustic sensor axially; and measure an acoustic response time series at the second azimuthal or axial position.

15. The apparatus of claim 13, wherein determining an acoustic response for the first location comprises collecting acoustic responses for a first plurality of sequentially adjacent points along the linear measurement path, wherein determining an acoustic response for the second location comprises collecting acoustic responses for a second plurality of sequentially adjacent points, and wherein the test point is between the first and second pluralities of sequentially adjacent points.

16. The apparatus of claim 15, wherein the first plurality of sequentially adjacent points are azimuthally offset from the second plurality of sequentially adjacent points.

17. The apparatus of claim 15, wherein the first plurality of sequentially adjacent points are axially offset along a length of a wellbore from the second plurality of sequentially adjacent points.

18. The apparatus of claim 15, wherein determining a material transition profile includes:

determining a first numeric central tendency derived from the acoustic responses for the first plurality of sequentially adjacent points;

determining a second numeric central tendency derived from the acoustic responses for the second plurality of sequentially adjacent points;

comparing the first and second numeric central tendencies; and generating a material transition profile based, at least in part, on a difference between the first and second numeric central tendencies.

19. The apparatus of claim 13, wherein the material transition profile comprise response differential values, said instructions further comprising instructions executable by the processor to cause the apparatus to determine material transition boundaries including:

comparing the response differential values; and identifying one or more material transition boundaries as corresponding to one or more test points having a larger response differential value than response differential values of one or more other test points within the linear measurement path.

20. A non-transitory, computer-readable medium having instructions stored thereon that are executable by a computing device to perform operations comprising:

determining a material transition profile for each of a plurality of test points within a linear measurement path including, for each test point,
   determining an acoustic response for a first location within the linear measurement path;
   determining an acoustic response for a second location within the linear measurement path, wherein the test point is between the first and second locations; and
   generating a material transition profile for the test point based, at least in part, on a difference between the acoustic response at the first location and the acoustic response at the second location.

\* \* \* \* \*